Aug. 12, 1952 D. P. ECKMAN 2,606,445
FLUID FLOW MEASURING APPARATUS
Filed Sept. 11, 1947 2 SHEETS—SHEET 2

INVENTOR.
DONALD P. ECKMAN

BY Arthur H. Swanson
ATTORNEY

Patented Aug. 12, 1952

2,606,445

UNITED STATES PATENT OFFICE 2,606,445

FLUID FLOW MEASURING APPARATUS

Donald P. Eckman, Ithaca, N. Y., assignor, by mesne assignments, to Minneapolis-Honeywell Regulator Company, Minneapolis, Minn., a corporation of Delaware Application September 11, 1947, Serial No. 773,399

9 Claims. (Cl. 73—207)

The present invention comprises improved apparatus for measuring fluid flow. The general object of the present invention is to provide improved means for varying the area of a flow orifice in accordance with variations in the rate of flow through the orifice as required to maintain an approximately constant difference between the pressures of the fluid at the inlet and outlet sides of the orifice.

More specifically, the object of the invention is to provide flow measuring apparatus comprising a valve or obturator member adjustable to vary a flow orifice area, and also comprising means for creating a control force proportional to the rate of flow through the orifice and for utilizing said control force in adjusting said valve or obturator member as required to maintain an approximately constant pressure drop through the orifice with all rates of flow therethrough.

In the preferred form of the present invention, the valve or obturator member is biased to a position at one end of its range of adjustment by a spring which has its tension increased proportionally by the displacement of said member away from said position, and the force by which the said member is adjusted is an air pressure which is varied in proportion to the rate of flow through the orifice. The apparatus used to produce the adjusting force may comprise air control apparatus elements of relatively simple, reliable and inexpensive commercial types and forms.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
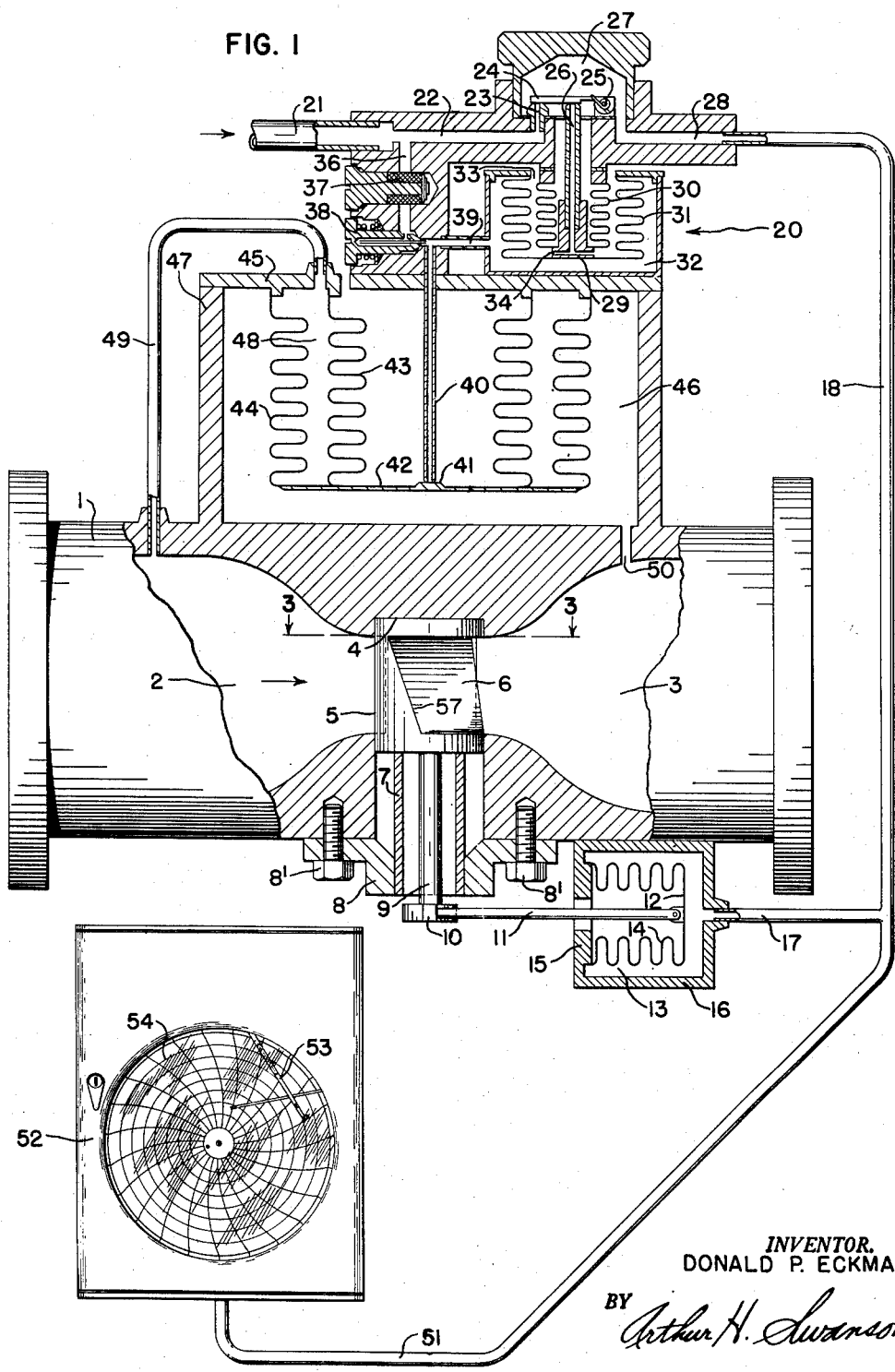
Fig. 1 is a view partly in sectional elevation and partly diagrammatic, illustrating a preferred embodiment of the present invention.
Figure 2:
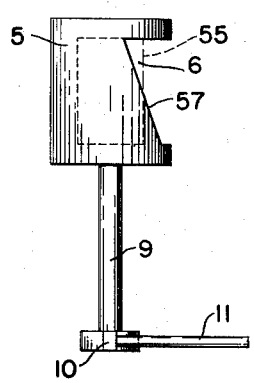
Fig. 2 is an elevation of the valve member adjusted to vary the flow orifice of the apparatus shown in Fig. 1.
Figure 3:
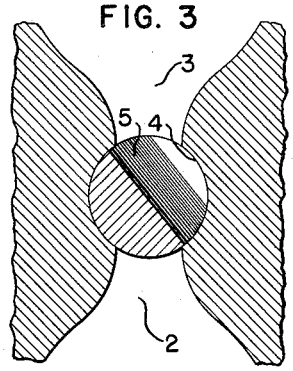
Fig. 3 is a partial section on the line 3—3 of Fig. 1.

In the desirable form of embodiment of the invention illustrated in Figs. 1, 2 and 3, I designates a conduit section or valve body having flanges at its ends for connection between other sections of a conduit through which a liquid or gas flows at a volumetric or quantity rate which is to be measured. The conduit is formed with an inlet passage 2 and an outlet passage 3, and a cylindrical valve chamber 4 opens at its opposite sides to the passages 2 and 3, respectively.

The valve chamber 4 is formed to receive a rotary valve or plug 5 which has cylindrical end portions journalled in the cylindrical valve chamber 4, and which is cut away between its end portions to form a space 6 between the valve member and one side wall of the valve chamber 4. The space 6 forms a flow orifice through the valve chamber when the valve is turned clockwise from its fully closed position shown in Fig. 3 and increases in its flow capacity as the displacement of the valve from its closed position increases. A torque tube 7 biases the valve or plug 5 to its wide open position in which it permits maximum flow through the valve chamber 4. The torque tube 7 is coaxial with the valve chamber 4 and has its upper end rigidly attached to the lower end of the valve member 5, and has its lower end rigidly secured to the body 1 at a considerable distance below the valve or plug 5.

As shown, the lower end of the tube 7 extends into and is brazed or otherwise rigidly secured in the central passage through an annular member 8 detachably clamped by bolts 8' against the portion of the body 1 surrounding the lower end of the valve chamber 4. The tube 7 is formed of spring metal and is sufficiently long, slender and thin-walled to permit the valve to be turned from its wide open position into its fully closed position as the flow through the conduit section 1 decreases to zero from the maximum quantity rate which the apparatus is designed to measure. The valve 5 is shown in its fully closed positions in Figs. 1 and 3, and is shown in a partly open position in Fig. 2.

The valve member 5 is turned counter-clockwise into its closed position as seen in Fig. 3, by means comprising a rigid stem portion 9 axially disposed in the torque tube 7 and having its lower end projecting out of the torque tube 7. At its lower end the stem 9 carries an arm 10 connected to one end of a link or stem 11 which has its other end attached to the movable wall 12 of a pressure chamber 13. In the desirable form of the invention illustrated in Figs. 1, 2 and 3, the movable wall 12 is the rigid, movable inner or rear end wall of a bellows element 14 having its other end secured to the front end wall 15 of a casing 16 which surrounds the bellows 14, and as shown, is secured to the conduit section 1. The pressure chamber 13 is the space within the casing 16 external to the bellows element 14 and its movable end wall 12. The front end wall 15 of the casing is formed with a large central opening through which the link or bellows stem 11 extends.

Air under a pressure which varies in inverse proportion to the rate of fluid flow through the conduit section 1, is transmitted to the chamber 13 through a branch 17 of the control pressure outlet pipe 18 of a pilot valve 20. Air under pressure is supplied to the pilot valve through a pipe 21 from a source of air at a suitable pressure, such as twenty pounds per square inch.

As shown, the pilot valve 20 is of a well known, non-bleed type in extensive use in air control apparatus. Some of the air supplied to the pilot valve through the pipe 21 passes through a channel 22 to a bleed nozzle 23 which is closed under steady operating conditions by a flapper valve 24. The latter is pivoted at 25 and is biased into its closed position, but may be moved away from its closed position by a tubular member 26. When the valve is out of its closed position, air flows through the nozzle 23 into the chamber 27. The pipe 18 is connected to the chamber 27 by a passage 28. The end of the tubular member 26, remote from the valve 24, is connected to a movable bellows end wall member 29. The latter is connected to the movable end of an inner bellows member 30 which forms a portion of the wall of the chamber 27 coaxial with and surrounding the tubular member 26. The bellows 30 is surrounded by a larger bellows element 31 which has a stationary upper end and has its lower end connected to the rigid wall part 29. The bellows 31 and end wall part 29 extend into and from the movable wall of a pressure chamber 32. The space between the bellows element 30 and 31 is open to the atmosphere through ports 33 at its upper end.

The tubular member 26 serves as a thrust member which moves the valve member 24 to open the bleed nozzle 23 when wall 29 moves upward, and serves as an exhaust nozzle to discharge air from the chamber 27 when the wall member 29 moves downward, so that the upper end of the passage 26 is not closed by the valve 24. The lower end of the axial passage in the member 26 is in communication with the atmosphere through the space between the bellows elements 30 and 31, the ports 33, and the channel 34 in the wall member 29.

While the pressure in the chamber 27 tends to elongate the bellows elements 30 and 31, the pressure in the chamber 32 tends to contract or shorten the bellows elements. The pressure in the chamber 32 is controlled by the difference between the pressures in the inlet and outlet passages 2 and 3 of the valve body 1. To this end, the pilot valve passage 22 is connected to the pressure chamber 32 by a passage 36 formed in the pilot valve structure and including an air filter 37 and a restriction tube 38. The passage 36 communicates directly with the chamber 32 through the restriction tube 38 and a conduit 39. The air pressure in passage 39 and chamber 32 is dependent on the rate at which air passing through the restriction tube 38 is permitted to escape to the atmosphere through a bleed nozzle 40.

The bleed nozzle 40 is a tubular member having its upper end anchored in the pilot valve structure, with the upper end of its axial passage in communication with the passage 39. The lower end of the passage in the nozzle 40 is closed or variably throttled by the portion 41 carried by the rigid but movable bellows end wall member 42, which is connected to the lower ends of inner and outer bellows elements 43 and 44. The upper ends of the bellows elements 43 and 44 are attached to a plate-like body 45 which serves as a support for the pilot valve structure 20, and the upper end wall of a chamber 46 into which the bellows structure, comprising the bellows elements 43 and 44 and movable end wall 42, depend. As shown, the bottom wall of the chamber 46 is formed by the body portion of the conduit section 1, and the wall surrounding the chamber 46 is formed by a cylindrical rib or flange portion 47 of the conduit section 1. The pressure in the inlet chamber 2 of the member 1 is transmitted to the space 48 between the elements 43 and 44 by a pipe 49. The pressure in the outlet passage 3 of the member 1 is transmitted to the chamber 46 by a channel 50 in the portion of the member 1 between the passage 3 and chamber 46.

In the normal operating condition of the apparatus, the pressure in the inlet passage 2 is higher than the pressure in the passage 3 and acts against the annular portion of the end member 42 which forms the lower end wall of the chamber 48 in a direction tending to elongate the bellows elements 43 and 44. At the same time, the pressure in the outlet passage 3 acts against the entire under surface of the wall 42 in the direction to contract the bellows elements 43 and 44. With the proper adjustment of the valve member or plug 5 for the existing rate of flow through the valve chamber 4, the pressures in the chambers 46 and 48 cause the wall 42 to permit the escape of air through the bleed nozzle 40 at the rate required to maintain the pressure in the pilot valve chamber 32 required to maintain the flapper valve 24 and nozzle 26 in the positions in which they respectively prevent flow of air through the nozzle 23 into the chamber 27, and flow of air out of the chamber through the nozzle 26.

On an increase or decrease in the difference between the pressures in the passages 2 and 3, the bellows end wall 42 is moved down or up. This respectively decreases or increases the pressure in the chamber 27. That pressure change transmitted through the pipes 18 and 17 to the pressure chamber 13 changes the length of the bellows 14 and thereby changes the area of the flow passage formed by the cut away portion 6 of the valve 5. On an increase in the pressure in the passage 2 relative to the pressure in the passage 3, the pressures in the chambers 27 and 13 are reduced, and the bias force exerted on the valve 5 by the torque tube 7 then angularly adjusts the valve 5 in the clockwise direction, as seen in Fig. 3. This adjustment increases the minimum area of the flow passage through the valve chamber 4, and thus reduces the pressure in the passage 2 relative to the pressure in the passage 3 and thereby tends to restore the normal operating condition in which the valve 5 is stationary in a position corresponding to the existing rate of flow past said valve. In such normal operating condition the pressure in the pilot valve 27 and the differential of the pressures in passages 2 and 3 have values in predeterminable correspondence with the position of the valve 5.

When the flow from the passage 2 through the valve chamber 4 into the passage 3 increases or decreases, the excess of the pressure in the passage 2 over the pressure in the passage 3 must respectively increase or decrease slightly to effect the adjustment of the valve 5 into its operating position corresponding to the increased or decreased rate of flow past the valve. The variations in the excess of the pressure in the passage 2 over the pressure in the passage 3, necessarily produced by changes in the rate of flow past the valve 4, may be very small, however, with properly designed apparatus since the only operative purpose and effect of such variations is to vary the minute difference between the movable bellows end wall 42 and the adjacent end of the nozzle 40. As those skilled in the art will understand, the total range of movement of the wall 42 required to vary the pressure in the pilot valve chamber 27 between its maximum and minimum values, may well be only about four thousandths of an inch.

The pressure in the chamber 27 is in predetermined proportion to the rate of flow through the conduit section 1 at all times so that a measure of the pressure in the chamber 27 provides an accurate measure of the quantity rate of flow through the conduit section 1. As diagrammatically shown in Fig. 1, the pressure in the chamber 27 is transmitted through the pipe 18 and its extension 51 to a recording instrument 52, including a pen arm 53 which records the value of the pressure in the chamber 27 on a disc chart 54. The usual scale lines on the chart disc may be arranged to indicate the pressure in the chamber 27 in pounds, or to indicate the rate of flow through the conduit section 1 in gallons per minute or other suitable flow units.

The mathematical relation between the pressure in the chamber 27 and the rate of flow through the section 1 depends, of course, upon the relation between the rate of flow through, and the fluid pressure drop in the valve chamber 4. While the pressure drop in a fluid flowing through a fixed orifice ordinarily varies in linear proportion to the square of the rate of flow, the valve 5 may be so formed that when any given change in the rate of flow occurs, the resultant valve adjustment will change the cross-sectional area of the most restricted portion of the flow passage through the valve chamber 4 by an amount which is in linear proportion to the flow rate change.

Thus, when the shape of the edge 57 of the left wall of the space 6, as seen in Fig. 2, extends approximately helically about the axis of the valve 5, and the edge portion of the right side wall of the passage 2 adjacent the valve chamber 4 is vertical, as is indicated in Fig. 2 by the dotted line 55, the most restricted portion of the flow passage through the valve chamber 4 is approximately triangular. In such case the area of said flow passage portion will vary in linear proportion to the volumetric rate of flow through the valve chamber 4 if the angular adjustments of the valve member 5 are in linear proportion to the changes in the air pressure transmitted to the chamber 13 from the chamber 27. This linear proportion between the volumetric rate of flow and the controlling air pressure is desirable, but not essential, in many cases.

As will be apparent, the invention is characterized by the use of pneumatic means to adjust the effective area of the restricted flow passage through the valve chamber 4, so as to keep the variations in the drop of the pressure of the fluid flowing through said passage produced by wide changes in the rate of fluid flow, very small, and so that the pilot valve output air pressure may form a practically accurate linear measure of the rate of flow.

The operation of the apparatus shown in Figs. 1, 2 and 3 is not effected by the inertia of the parts or of the fluid flowing, whether the latter is a liquid or a gas. There is practically no measuring lag. The lag coefficient may be made as small as five-thousandths of a minute. The valve 5 may be cut away to form the flow space 6 in such manner as to give any desirable scale relation between the quantity rate of fluid flow and the air pressure measured by the instrument 52. The mounting of the valve member 5 includes no packing gland. The measuring apparatus requires no mercury or other manometer sealing liquid. The apparatus is well adapted for use in measuring the flow of fluids under high pressures. The measuring apparatus effects no abrupt change in the direction of flow of the fluid measured, and the pressure drop through the body 1 may be kept quite small by suitably shaping the walls of the passages 2 and 3. While the apparatus shown in Fig. 1 will ordinarily be used in the upright position shown in Fig. 1, that position of the apparatus is not essential to its operativeness.

Figure 4:
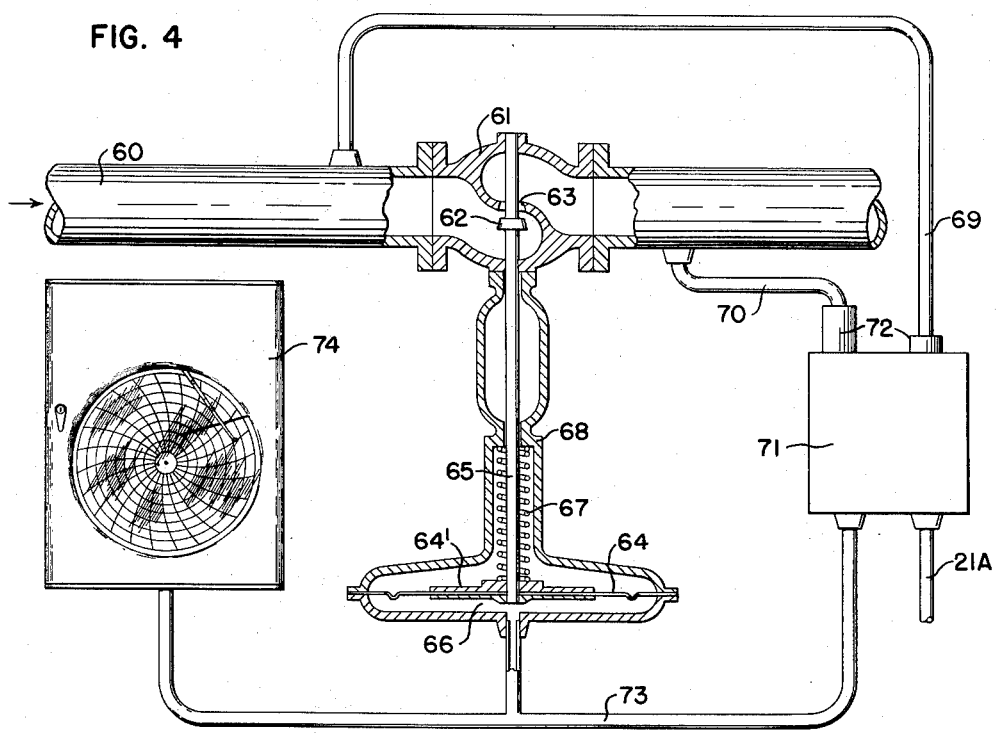
Fig. 4 is an elevation, partly in section and partly diagrammatic, illustrating a modification of the apparatus shown in Figs. 1, 2 and 3.

While Figs. 1–3 illustrate the form of my invention which I now prefer, the general principles of my invention may be utilized in apparatus of different forms. One such alternative form is diagrammatically illustrated by way of example in Fig. 4. In Fig. 4, the flow through a conduit 60 is measured by means which include a valve body 61 in the conduit 60, and a valve plug or obturator 62 which is adjustable in a direction transverse to the length of the conduit 60 to thereby vary the effective area of the flow passage through the port 63 variably throttled by the valve member 62. As shown, the valve 61 is of standard diaphragm type, comprising a diaphragm 64 which is connected to the valve stem 65 and forms one side of a pressure chamber 66. The valve member 62 is biased to its open position by a spring 67 surrounding the stem 65 and acting between an abutment 68 forming part of stationary valve structure and the reinforced central portion 64' of the diaphragm 64. The pressures in the conduit 60 at the up-stream and down-stream sides of the valve 61 are transmitted by pipes 69 and 70, respectively, to an instrument 71. The latter includes a differential pressure gauge element 72, and means actuated thereby to maintain a control air pressure in predetermined proportion to the difference between the pressures in the pipes 69 and 70. The control air pressure thus created is transmitted from the instrument 71 through a pipe 73 to the pressure chamber 66 of the diaphragm valve to adjust the valve member 62 as required to keep the minimum flow area through the valve approximately proportional to the volumetric rate of flow through the conduit. The control air pressure is also transmitted through pipe 73 to a measuring instrument 74 adapted to record the varying values of the control pressure and thereby provide a record of the rate of flow through the conduit 60. The instrument 71 is connected by a pipe 21A to a source of air under a constant pressure which may be of the order of 20 pounds per square inch.

Further illustration or description of the instrument 71 is unnecessary herein as it may be of a known type of instrument for maintaining a control air pressure varying in predetermined proportion with a pressure differential. In particular, the differential pressure gauge element 72 of the instrument 71 may be a manometer tube including a float and may be associated with other apparatus to maintain a control air pressure proportional to the differential of the pressures transmitted to the two legs of the manometer tube, as disclosed in the Moore patent, No. 2,311,853 of February 23, 1943.

While the apparatus shown in Fig. 4 requires the use of a sealing liquid, ordinarily mercury, in its U tube manometer, and the control air pressure which it maintains is proportional to the square and not to the first power of the rate of flow through the conduit 60, the Fig. 4 apparatus is like the apparatus shown in Figs. 1, 2 and 3, in that it maintains an approximately constant difference between the pressures at the opposite sides of a regulable flow orifice included in the conduit and gives other practically important advantages and desirable operating results obtainable with the form of the invention shown in Figs. 1-3.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. Flow measuring apparatus comprising in combination, a structure formed with a flow passage including a regulable flow orifice, a differential pressure device responsive to the pressure drop in the fluid flowing through said orifice for maintaining a control force tending to close said orifice and varying in predetermined accordance with changes in the rate of fluid flow through said passage, orifice regulating means including means for maintaining a bias force which tends to open said orifice and increases as the first mentioned force is increased, and means actuated by the differential of said forces to directly increase and decrease the cross sectional area of said orifice as said rate of flow increases and decreases so that the variation in said pressure drop produced by wide changes in said rate of flow are relatively minute.

2. Flow measuring apparatus as sepecified in claim 1, in which the control force is an air pressure and in which said device comprises a chambered structure with a movable member therein forming a partition separating two pressure chambers, means for transmitting the pressure of the fluid in said conduit at the inlet side of the regulable flow orifice to one of said chambers and means for transmitting the pressure in said conduit at the other side of said orifice to the second of said chambers, air control apparatus comprising a stationary bleed nozzle having one end in position to be opened and closed by said member as the latter moves in response to changes in the differential of the pressures in said chambers, means including a restricted flow passage connecting the other end of said nozzle to a source of air under pressure, and pilot valve means actuated by the variations in the pressure in said nozzle.

3. Flow measuring apparatus as specified in claim 1, in which the regulable flow orifice comprises a valve chamber formed in said structure and forming part of said flow passage and a valve member mounted in said chamber and movable relative to said structure to variably throttle the portion of said passage formed by said valve chamber.

4. Flow measuring apparatus comprising in combination, a conduit including a regulable flow orifice, an orifice obstructing element movable between orifice wide open and orifice closed positions, means for continuously maintaining a predetermined bias force tending to hold said element in its wide open position and progressively increasing as said element is moved toward said closed position, means responsive to the pressure drop in the fluid flowing through said orifice for maintaining a control force varying in predetermined accordance with changes in the rate of fluid flow through the conduit and tending to move said element into its closed position, whereby said element is moved by the differential of said forces to increase and decrease the cross sectional area of said orifice as said rate of flow increases and decreases so that the variation in said pressure drop produced by wide changes in said rate of flow are relatively minute, and means for measuring and recording said force.

5. Flow measuring apparatus comprising a hollow body having inlet and outlet passages and formed with a cylindrical valve chamber between said passages and extending transversely thereof and having an opening at one side for the flow of fluid into said chamber from said inlet passage, and an opening at its opposite side for the outflow of fluid from said chamber into said outlet passage, a rotary valve member having cylindrical end portions of equal diameter fitting in portions of said valve chamber at the opposite ends of said openings and having an intermediate portion of reduced cross-section and shaped to variably throttle flow through said chamber from said inlet passage to said outlet passage as said valve member is angularly adjusted, and means responsive to the difference between the pressures in said inlet and outlet passages and a force transmitting connection between that means and said valve member for angularly adjusting said valve member as required to maintain said pressure difference approximately constant as the rate of fluid flow through said body varies.

6. Flow measuring apparatus as specified in claim 5, including a torque tube connected at one end to said body and at the other end to said valve and biasing the latter to a predetermined angular position.

7. Flow measuring apparatus as specified in claim 5, including a torque tube having one end secured to one of said valve portions and including an annular member to which the second end of said tube is attached, said annular member being detachably secured to said body at the margin of the outer end of said valve chamber, and in which said valve has a stem longitudinally disposed in said tube, extending through the central opening in said annular member and forming part of said force transmitting connection.

8. Flow measuring apparatus comprising a hollow body having end to end inlet and outlet passages and formed with a cylindrical valve chamber having an opening at one side for the flow of fluid into said chamber from said inlet passage, and an opening at its opposite side for the outflow of fluid from said chamber into said outlet passage, said chamber having cylindrical end portions, a rotary valve member having cylindrical end portions fitting in the cylindrical end portions of said valve chamber and having an intermediate portion of reduced cross section and shaped to variably throttle flow through said chamber from said inlet passage to said outlet passage as said valve member is angularly adjusted, a torque tube having one end attached to said valve member and having its opposite end connected to said body at a distance from said openings, and means responsive to the difference between the pressures in said inlet and outlet passages for subjecting said valve member to a torque proportional to said pressure difference, whereby the angular position of said valve member in said valve chamber is jointly dependent on the magnitude of said torque and on the angular displacement of the valve member from the position in which the torque tube tends to hold said valve member.

9. Flow measuring apparatus comprising a body structure formed with a flow passage including inlet and outlet portions, and formed with aligned cylindrical valve chamber portions at opposite sides of said passage, a rotary valve member having a body portion extending across said passage between said inlet and outlet portions and having cylindrical end portions respectively journalled in said valve chamber portions, a torque tube coaxial with said chamber portions and having one end rigidly connected to one end of said valve member and having its other end anchored in said body structure, a valve stem within said tube and coaxial with said valve chamber end portions and having one end attached to said one end of said valve member and having its other end external to said tube, said valve body portion being shaped to form a port connecting said inlet and outlet passage portions which decreases in cross section as said valve is rotated out of its normal position, and means responsive to the difference between the pressures in said inlet and outlet passage portions and including a force transmitting connection to the end of said stem remote from said valve for angularly adjusting said stem and valve member to maintain said pressure difference approximately constant as the rate of fluid flow through said body varies.

DONALD P. ECKMAN.

REFERENCES CITED

The following references are of record in the file of this patent:

UNITED STATES PATENTS

| Number | Name | Date |
|---|---|---|
| 1,020,735 | Alexander | Mar. 19, 1912 |
| 1,487,402 | Roucka | Mar. 18, 1924 |
| 1,517,728 | Heath | Dec. 2, 1924 |
| 2,092,019 | Randel | Sept. 7, 1937 |
| 2,399,938 | Pett | May 7, 1946 |